US006769290B2

(12) United States Patent
Fabre

(10) Patent No.: US 6,769,290 B2
(45) Date of Patent: Aug. 3, 2004

(54) LEAK DETECTION IN A CLOSED VAPOR HANDLING SYSTEM USING A PRESSURE SWITCH, TEMPERATURE AND STATISTICS

(75) Inventor: Laurent Fabre, Portet sur Garonne (FR)

(73) Assignee: Siemens Automotive S.A. (FR)

( * ) Notice: Subject to any disclaimer, the term of this patent is extended or adjusted under 35 U.S.C. 154(b) by 0 days.

(21) Appl. No.: 09/789,360

(22) Filed: Feb. 21, 2001

(65) Prior Publication Data

US 2001/0027680 A1 Oct. 11, 2001

Related U.S. Application Data

(60) Provisional application No. 60/184,193, filed on Feb. 22, 2000.

(51) Int. Cl.[7] ............ G01M 3/04

(52) U.S. Cl. ............ 73/49.7; 702/51

(58) Field of Search ............ 73/40, 40.5 R, 73/49.7, 110.1; 123/50; 702/5

(56) References Cited

U.S. PATENT DOCUMENTS

| | | | | | |
|---|---|---|---|---|---|
| 5,143,035 | A | | 9/1992 | Kayanuma | 123/198 |
| 5,263,462 | A | * | 11/1993 | Reddy | 123/520 |
| 5,275,144 | A | * | 1/1994 | Gross | 123/520 |
| 5,295,472 | A | | 3/1994 | Otsuka et al. | 123/520 |
| 5,317,909 | A | * | 6/1994 | Yamada et al. | 73/118.1 |
| 5,398,661 | A | | 3/1995 | Denz et al. | 123/520 |
| 5,490,414 | A | | 2/1996 | Durschmidt et al. | 73/49.2 |
| 5,744,701 | A | | 4/1998 | Peterson et al. | 73/49.2 |
| 5,750,888 | A | | 5/1998 | Matsumoto et al. | 73/118.1 |
| 5,781,877 | A | * | 7/1998 | Rachel et al. | 701/104 |
| 5,957,115 | A | | 9/1999 | Busato et al. | 123/520 |
| 5,967,124 | A | | 10/1999 | Cook et al. | 123/520 |
| 5,988,206 | A | | 11/1999 | Bare et al. | 137/354 |
| 6,073,487 | A | | 6/2000 | Dawson | 73/118.1 |
| 6,089,081 | A | * | 7/2000 | Cook et al. | 73/118.1 |
| 6,105,556 | A | * | 8/2000 | Takaku et al. | 123/520 |

(List continued on next page.)

FOREIGN PATENT DOCUMENTS

| | | |
|---|---|---|
| EP | 0 598 176 | 3/1994 |
| EP | 0 611 674 | 8/1994 |
| EP | 0 952 332 | 10/1999 |
| FR | 2 732 072 | 9/1996 |
| WO | WO 99/18419 | 4/1999 |
| WO | WO 99/37905 | 7/1999 |

OTHER PUBLICATIONS

Fabre, U.S. patent application Publication, US 2001/0027680 A1, Oct. 11, 2001.*

(List continued on next page.)

*Primary Examiner*—Hezron Williams
*Assistant Examiner*—Charles D. Garber

(57) ABSTRACT

A method of leak detection in a closed vapor handling system of an automotive vehicle, wherein an engine is shut off, implemented by a system, the method including obtaining a start temperature and start pressure, providing an evaluation temperature, calculating a temperature differential between the start temperature and the evaluation temperature, evaluating whether a pressure switch is closed if the temperature differential is greater than a temperature control value, incrementing a time counter if the pressure switch is not closed and comparing the time counter to a time control value if the pressure switch is not closed. The system includes a pressure switch, a temperature sensing element, and a processor operatively coupled to the pressure switch and the temperature sensing element and receiving, respectively, pressure and temperature signals therefrom, wherein the processor calculates a temperature differential between a start temperature and an evaluation temperature, evaluates whether the pressure switch is closed, increments a time counter, and compares the time counter to the time control value.

24 Claims, 3 Drawing Sheets

U.S. PATENT DOCUMENTS

| | | | | |
|---|---|---|---|---|
| 6,158,270 | A | 12/2000 | Garman et al. | 73/40.7 |
| 6,164,123 | A | 12/2000 | Corkill | 73/49.7 |
| 6,182,642 | B1 | 2/2001 | Ohkuma | 123/520 |
| 6,314,797 | B1 * | 11/2001 | Dawson et al. | 73/49.2 |

OTHER PUBLICATIONS

Fabre, U.S. patent application Publication, US 2001/0032625 A1, Oct. 25, 2001.*

Fabre, U.S. patent application Publication, US 2001/0032626 A1, Oct. 25, 2001.*

International Search Report for Application No. PCT/CA01/00225; Jun. 11, 2001.

International Search Report for Application No. PCT/CA01/00024, Jun. 11, 2001.

* cited by examiner

LEAK DETECTION IN A CLOSED VAPOR HANDLING SYSTEM USING A PRESSURE SWITCH, TEMPERATURE AND STATISTICS

REFERENCE TO RELATED APPLICATION

This application expressly claims the benefit of the earlier filing date and right of priority from the following patent application: U.S. Provisional Application Ser. No. 60/184,193, filed on Feb. 22, 2000 in the name of Laurent Fabre and Pierre Calvairac and entitled "Vacuum Detection." The entirety of that earlier filed co-pending provisional patent application is expressly incorporated herein by reference.

FIELD OF INVENTION

This invention relates to leak detection methods and systems, and more particularly, to automotive fuel leak detection using a pressure switch, a temperature differential and statistics.

BACKGROUND OF INVENTION

In a vapor handling system for a vehicle, fuel vapor that escapes from a fuel tank is stored in a canister. If there is a leak in the fuel tank, the canister, or any other component of the vapor handling system, fuel vapor could exit through the leak to escape into the atmosphere.

Vapor leakage may be detected through evaporative monitoring. This evaporative monitoring may be performed while an engine is running, where pressure decrease may be analyzed. This type of evaporative monitoring may detect 1 mm and larger leaks, however, it is believed that many parameters influence the accuracy of the diagnosis. Therefore, it is believed that evaporative monitoring when the engine is off is more reliable.

SUMMARY OF THE INVENTION

The present invention provides a method of leak detection in a closed vapor handling system of an automotive vehicle, wherein an engine is shut off. The method includes obtaining a start temperature, providing an evaluation temperature, calculating a temperature differential between the start temperature and the evaluation temperature, evaluating whether a pressure switch is closed if the temperature differential is greater than a temperature control value, incrementing a time counter if the pressure switch is not closed, and comparing the time counter to a time control value if the pressure switch is not closed.

The present invention also provides another method of leak detection in a closed vapor handling system of an automotive vehicle, wherein an engine is shut off. This method includes determining whether the engine is off, closing a shut off valve, providing a pressure switch, a temperature sensing element, and an engine management system to receive pressure and temperature signals from the pressure switch and temperature sensing element, obtaining a start temperature and providing an evaluation temperature, calculating a temperature differential between the start temperature and the evaluation temperature, comparing the temperature differential to a temperature control value, evaluating whether the pressure switch is closed when the temperature differential is greater than a temperature control value, determining a no leak condition if the pressure switch is closed, incrementing a time counter if the pressure switch is not closed, comparing the time counter to a time control value if the pressure switch is not closed, determining a leak condition if the time counter is greater than the time control value, and determining a diagnosis not performed condition if the time counter is not greater than the time control value.

The present invention also provides an automotive evaporative leak detection system. The system includes a pressure switch, a temperature sensing element, and a processor operatively coupled to the pressure switch and the temperature sensing element and receiving, respectively, pressure and temperature signals therefrom. The processor calculates a temperature differential between a start temperature and an evaluation temperature, evaluates whether a pressure switch is closed, increments a time counter, and compares the time counter to a time control value.

The present invention further provides another automotive evaporative leak detection system. This system includes a pressure switch located on a conduit between a fuel tank and a canister, a temperature sensor mounted on the fuel tank, a shut off valve located between the canister and an atmosphere, a control valve located between the canister and an engine, and a processor operatively coupled to the pressure switch and the temperature sensor and receiving, respectively, pressure and temperature signals therefrom. The canister communicates with the engine and the atmosphere, the fuel tank communicates with the engine and the processor opens and closes the shut off valve and the control valve. The processor also calculates a temperature differential between a start temperature and an evaluation temperature, evaluates whether a pressure switch is closed, increments a time counter, and compares the time counter to a time control value.

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain the features of the invention.

DETAILED DESCRIPTION OF THE PREFERRED EMBODIMENTS

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical automotive vehicles and vapor handling systems.

Figure 1:
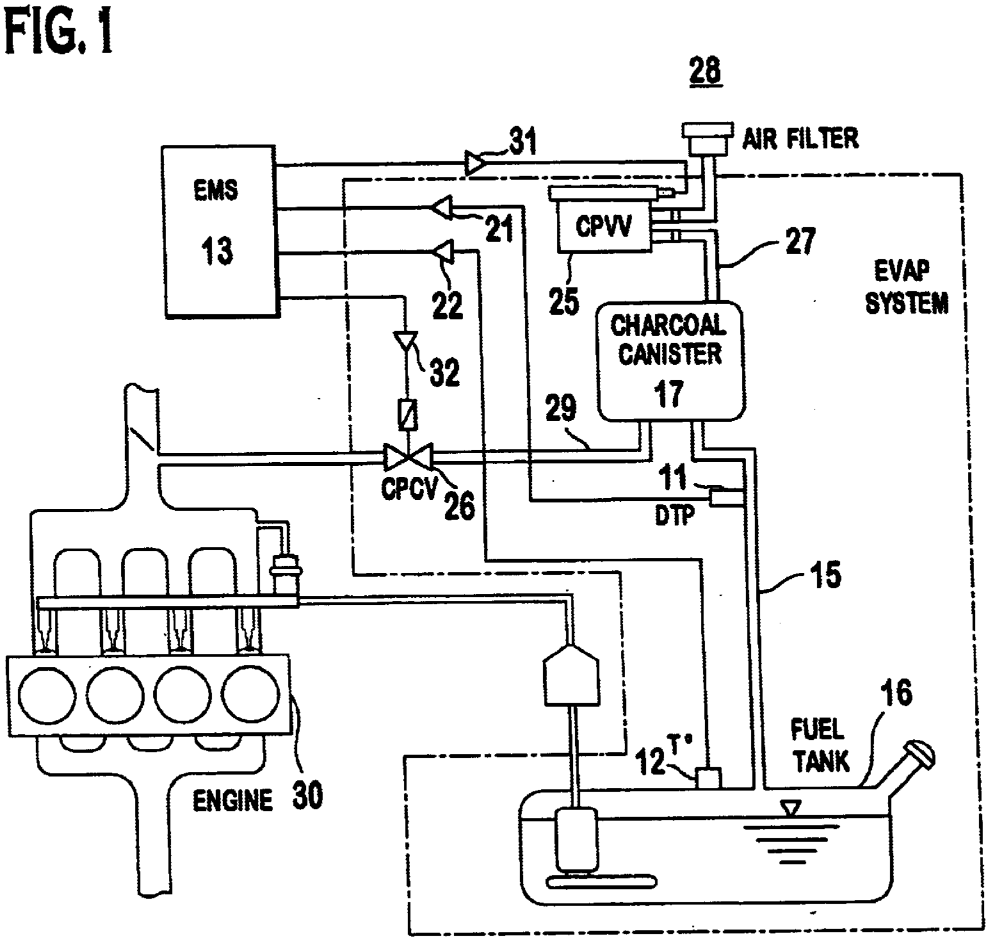
FIG. 1 is a schematic view of a preferred embodiment of the system of the present invention.

As shown in FIG. 1, an evaporative leak detection system 10 in an automotive vehicle includes a pressure switch 11, a temperature sensing element 12, and a processor 13. Preferably, the pressure switch 11 is in fluid communication with vapor in a fuel tank 16. The pressure switch 11, preferably, moves at different relative vacuums having a low vacuum threshold for small leak detection of about 0.5 mm and a high vacuum threshold for large leak detection of about 1 mm. Preferably, the temperature sensing element 12 is in thermal contact with the vapor in the fuel tank 16. In the preferred embodiment, the temperature sensing element 12 is a temperature sensor mounted on the fuel tank 16. The accuracy of the temperature measurements are more accurate if the temperature sensing element 12 is located close to the fuel tank 16. The temperature sensing element 12 may also be a transducer, or resistor/capacitor assembly, that supplies differential temperature or a model based on induction air temperature and engine coolant temperature with a statistical treatment.

The system 10 may also include a shut off valve 25 and a control valve 26. The shut off valve 25, or preferably, a canister purge vent valve, is located on a conduit 27 between the canister 17 and the atmosphere 28. The shut off valve 25 is normally open. Closing the shut off valve 26 hermetically seals the system 10 from the atmosphere 28. The control valve 26, or preferably, a canister purge control valve, is located on a conduit 29 between the canister 17 and an engine 30. The engine 30 communicates with the fuel tank 16 and the canister 17. Closing the control valve 26 seals the system 10 from the engine 30.

The processor 13, or engine management system, is operatively coupled to, or in communication with, the pressure switch 11, the temperature sensing element 12, the shut off valve 25 and the control valve 26. The processor 13 receives and processes pressure and temperature signals 21 and 22, respectively, from the pressure switch 11 and temperature sensing element 12, respectively, and sends signals 31 and 32, respectively, to open and close the valves 25 and 26, respectively. The processor 13 can either include the necessary memory or clock or be coupled to suitable circuits that implement the communication. The processor 13 also calculates a temperature differential between a start temperature and an evaluation temperature, increments a time counter, evaluates whether the pressure switch 11 is closed, and compares the time counter to a time control value.

The system 10 implements a method of leak detection, or leak detection diagnosis, when the system determines that the engine 30 is shut off. This method may detect 0.5 mm leaks, as well as 1 mm leaks. This method is based on vacuum detection, where a vacuum is generated by a temperature decrease in the system 10. The physical principle is based on the physical law:

$$P \cdot V = n \cdot R \cdot T,$$

where: $P$ = pressure
$V$ = volume
$n$ = Mass
$R$ = gas constant; and
$T$ = temperature.

At constant volume in a closed system, a temperature variation coincides with a pressure variation, where:

$$\Delta P \cdot V = n \cdot R \cdot \Delta T.$$

Therefore, when the engine is off and there is no leak, a tank temperature decrease will lead to a tank pressure decrease. Conversely, if there is a leak in the system, which causes an airflow entrance into the fuel tank 16, when the temperature decreases, there will be no pressure variation.

Figure 2:
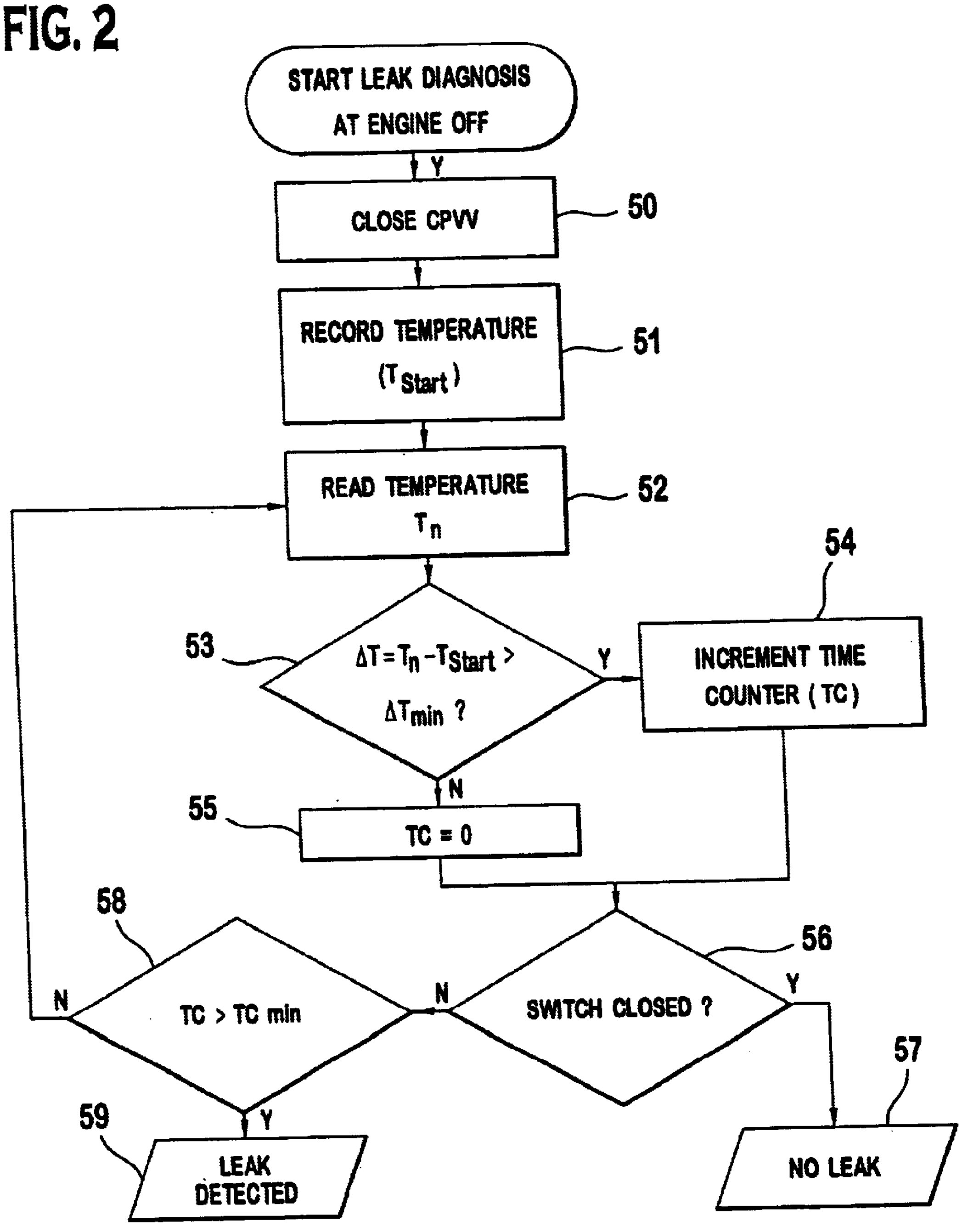
FIG. 2 is a block diagram of a first embodiment of the method of the present invention.

As shown in FIG. 2, when the engine is off, in step 50, preferably, the shut off valve 25 is closed. Preferably, the processor 13 sends the signal 31 to close the shut off valve 25. The system 10 will be sealed from the engine 30 and the atmosphere 28 and an ambient temperature decrease will lead to a temperature decrease in the fuel tank 16. The processor 13 receives a start temperature from the temperature sensing element 12 in step 51. To measure the decrease of temperature, in step 52, an evaluation temperature is also provided by the temperature sensing element 12 to the processor 13. This evaluation temperature is read after a specified period of time. It should be understood that the specified period of time is determined based on the particular system's application such that the specified period of time is measured between the start temperature reading and the evaluation temperature reading. The processor 13 calculates, in step 53, the temperature differential, which is the difference between the start temperature and the evaluation temperature, and compares the temperature differential to a temperature control value. It should be understood that the temperature control valve is determined based on the outside, or ambient, temperature, the fuel tank temperature when the engine is running and the expected decrease in temperature over time when the engine is shut off and there is no leak.

If the temperature differential is greater than the temperature control value, a time counter is incremented in step 54. On the other hand, if the temperature differential is not greater then the temperature control value, the time counter is set to zero in step 55. Whether the temperature differential is greater than or not greater than the temperature control value, in step 56, the processor 13 evaluates whether the pressure switch 11 is closed. If the pressure switch 11 is closed, then a no leak condition is determined in step 57 and the leak detection diagnosis will end. Since the volume of the fuel tank 16 is constant, the gas mass within the fuel tank 16 is constant, and the temperature is decreasing, if the pressure also is decreasing, there is no leak.

On the other hand, if the pressure switch is not closed, then the processor 13 compares the time counter to a time control value in step 58. If the time counter is not greater than the time control value, another evaluation temperature will be read in step 52. However, if the time counter is greater than the time control value, then the system 10 determines a leak condition in step 59. Since the temperature is decreasing and the volume of the fuel tank 16 is constant, the gas mass within the fuel tank 16 is increasing and there will be no change in pressure after a short transient of time.

Figure 3:
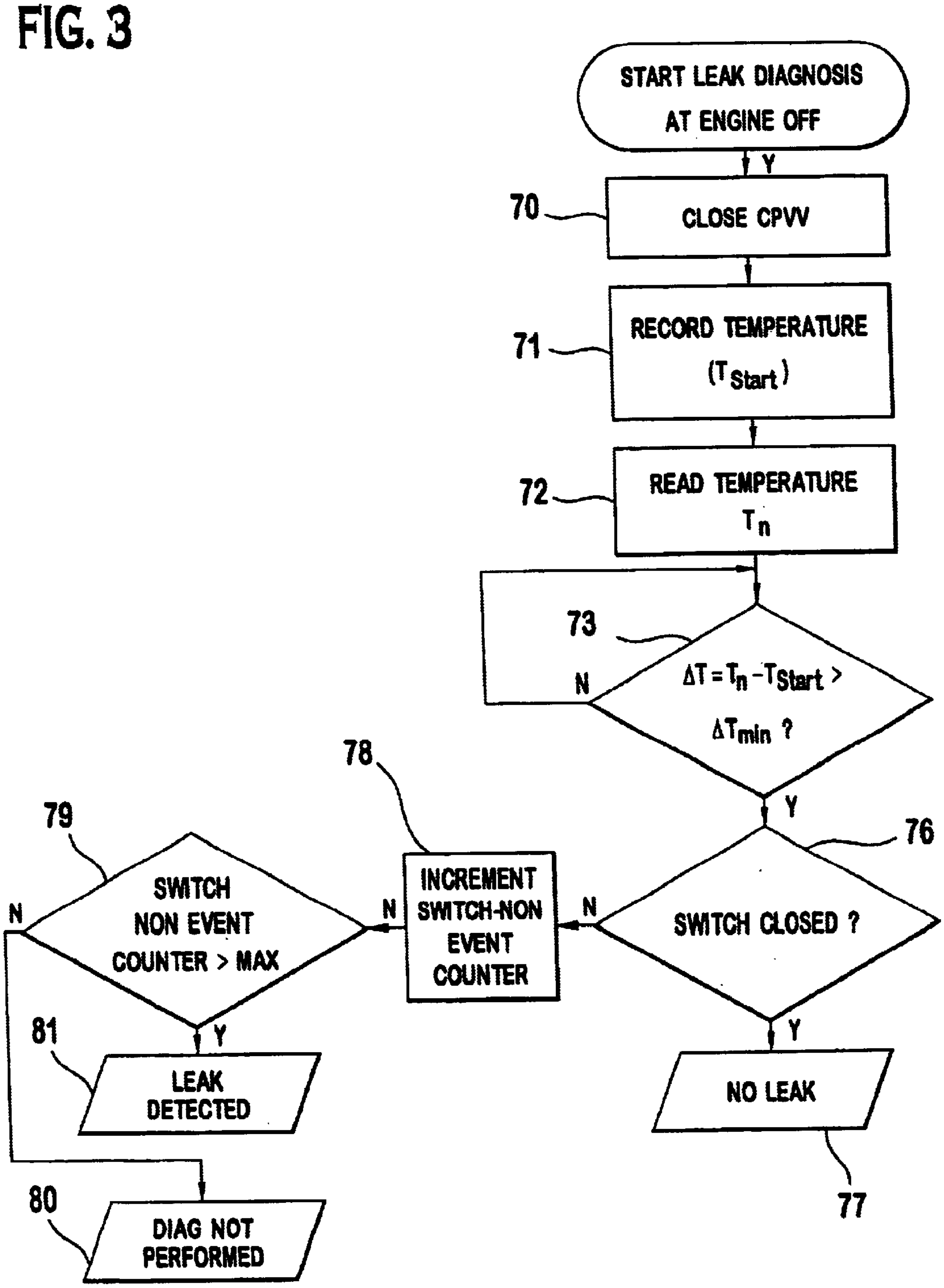
FIG. 3 is a block diagram of a second embodiment of the method of the present invention.

A second and preferred method, as shown in FIG. 3, is based on an algorithm with a statistic. In this method, in step 70, the shut off valve 25 is closed. In step 71, the processor 13 receives a start temperature from the temperature sensing element 12. In step 72, an evaluation temperature is also provided by the temperature sensing element 12 to the processor 13. The processor 13 then calculates, in step 73, the temperature differential and compares the temperature differential to a temperature control value. If the temperature differential is not greater than the temperature control value, then a new temperature differential will be calculated based on a new evaluation temperature. The processor 13 will compare the new temperature differential to the temperature control value. This process in step 73 repeats until the temperature differential is greater than the temperature control value.

If and when the temperature differential is greater than the temperature control value, the processor 13 evaluates whether the pressure switch is closed in step 76. If the pressure switch 11 is closed, then a no leak condition is determined in step 77 and the leak detection diagnosis will end. On the other hand, if the pressure switch 11 is not closed, then the processor 13 increments a non-event, or time, counter in step 78 and compares the non-event counter to a counter, or time, control value in step 79. If the non-event counter is not greater than the counter control value, the system 10 determines that a leak diagnosis was not performed in step 80, or the leak diagnosis was not conclusive. However, if the non-event counter is greater than the counter control value, then the system 10 determines a leak condition in step 81.

While the invention has been described in detail and with reference to specific features, it will be apparent to one skilled in the art that various changes and modifications can be made therein without departing from the spirit and scope of the invention. It is intended that the present invention cover the modifications and variations of this invention provided they come within the scope of the appended claims and their equivalents.

I claim:

1. A method of leak detection in a closed vapor handling system of an automotive vehicle, wherein an engine is shut off, comprising:

obtaining a start temperature;

providing an evaluation temperature using a model based on induction air temperature and engine coolant temperature with a statistical treatment;

calculating a temperature differential between the start temperature and the evaluation temperature;

evaluating whether a pressure switch is closed if the temperature differential is greater than a temperature control value;

incrementing a time counter if the pressure switch is not closed; and comparing the time counter to a time control value if the pressure switch is not closed.

2. The method of claim 1 further comprising:

closing a shut off valve.

3. The method of claim 1 further comprising:

providing a pressure switch that moves at a given relative vacuum.

4. The method of claim 1 further comprising:

providing a temperature sensing element.

5. The method of claim 4 wherein the providing comprises:

using a temperature sensor.

6. The method of claim 4 wherein the providing comprises:

using a transducer that supplies differential temperature.

7. The method of claim 1 further comprising:

determining whether the engine is off.

8. The method of claim 1 further comprising:

providing an engine management system to receive pressure and temperature signals from the pressure switch and a temperature sensing element.

9. The method of claim 1 wherein the comparing comprises:

determining a leak condition if the time counter is greater than the time control value.

10. The method of claim 9 wherein the determining comprises:

detecting a leak of about 0.5 millimeter.

11. The method of claim 9 wherein the determining comprises:

detecting a leak of about 1 millimeter.

12. The method of claim 1 wherein the computing comprises;

determining a no leak condition if the pressures switch is closed.

13. The method of claim 1 further comprising:

comparing the temperature differential to the temperature control value.

14. The method of claim 1 wherein the calculating comprises:

recalculating a new temperature differential between the start temperature and a new evaluation temperature if the temperature differential is not greater than the temperature control value.

15. The method of claim 1 wherein the comparing comprises:

determining a diagnosis not performed condition if the time counter is not greater than the time control value.

16. An automotive evaporative leak detection system comprising:

a pressure switch;

a temperature sensing element including a model based on induction air temperature and engine coolant temperature with a statistical treatment; and a processor operatively coupled to the pressure switch and the temperature sensing element and receiving, respectively, pressure and temperature signals therefrom;

wherein the processor calculates a temperature differential between a start temperature and an evaluation temperature, evaluates whether a pressure switch is closed, increments a time counter if the pressure switch is not closed, and compares a time counter to the time control value.

17. The system of claim 16 wherein the pressure switch is in fluid communication with fuel tank vapor.

18. The system of claim 16 wherein the temperature sensing element is in thermal contact with fuel tank vapor.

19. The system of claim 16 wherein the processor is in communication with the pressure switch and the temperature sensing element.

20. The system of claim 16 wherein the processor compares the temperature differential to a temperature control value.

21. The system of claim 16 wherein the temperature sensing element comprises a temperature sensor mounted on a fuel tank.

22. The system of claim 16 wherein the pressure switch moves at a given relative vacuum.

23. The system of claim 16 wherein the pressure switch is located on a conduit between a fuel tank and a canister.

24. The system of claim 16 wherein the temperature sensing element comprises a transducer that supplies differential temperature.

* * * * *